US011965369B2

(12) United States Patent
Ferrari et al.

(10) Patent No.: US 11,965,369 B2
(45) Date of Patent: Apr. 23, 2024

(54) 3-D ADJUSTABLE HIDDEN HINGE FOR FLUSH OR REBATED DOOR OR WINDOW APPLICATIONS

(71) Applicant: SFS Group International AG, Heerbrugg (CH)

(72) Inventors: Matteo Ferrari, Pordenone (IT); Matia Ius, Zoppola (IT); Stefano Cusin, Pordenone (IT); Mauro Giust, Sacile (IT); Massimiliano Pitussi, Spilimbergo (IT)

(73) Assignee: SFS Group International AG, Heerbrugg (CH)

( * ) Notice: Subject to any disclaimer, the term of this patent is extended or adjusted under 35 U.S.C. 154(b) by 270 days.

(21) Appl. No.: 17/482,001

(22) Filed: Sep. 22, 2021

(65) Prior Publication Data

US 2022/0090424 A1 Mar. 24, 2022

Related U.S. Application Data

(60) Provisional application No. 63/081,480, filed on Sep. 22, 2020.

(51) Int. Cl.
*E05D 3/18* (2006.01)
*E05D 7/04* (2006.01)

(52) U.S. Cl.
CPC ............... *E05D 3/18* (2013.01); *E05D 3/186* (2013.01); *E05D 7/04* (2013.01); *E05D 2007/0476* (2013.01); *E05Y 2600/41* (2013.01)

(58) Field of Classification Search
CPC ........... E05D 3/18; E05D 3/183; E05D 3/186; E05D 2007/0476; E05D 7/04; E05D 3/16; E05D 2003/166; E05Y 2600/41
See application file for complete search history.

(56) References Cited

U.S. PATENT DOCUMENTS

| | | | | | |
|---|---|---|---|---|---|
| 2,608,713 | A * | 9/1952 | Soss | E05D 3/186 | 16/337 |
| 3,001,224 | A * | 9/1961 | Soss | E05D 3/16 | 16/379 |
| 7,861,378 | B2 * | 1/2011 | Neukotter | E05D 3/06 | 16/242 |
| 8,196,265 | B2 * | 6/2012 | Neukoetter | E05D 3/186 | 16/382 |
| 8,621,717 | B2 * | 1/2014 | Liermann | E05D 3/186 | 16/366 |
| 8,683,651 | B2 * | 4/2014 | Liermann | E05D 7/04 | 16/236 |

(Continued)

FOREIGN PATENT DOCUMENTS

EP 3757322 A1 * 12/2020 ............ E05D 3/186

*Primary Examiner* — Jeffrey O'Brien
(74) *Attorney, Agent, or Firm* — Volpe Koenig

(57) ABSTRACT

An adjustable hidden or invisible hinge for mounting a door-panel or window sash to a frame is provided that is useable for either rebated or flush mount applications using the same hinge. This is possible due to the use of two different types of arm systems that connect the frame part of the hinge to the sash or door part. These include a rotational lever arm system that allows for 180° guided rotational movement which is combined with a translational arm system that at the same time superimposes a translational movement of the sash movable body relative to the sash body.

15 Claims, 18 Drawing Sheets

(56) References Cited

U.S. PATENT DOCUMENTS

| | | | | |
|---|---|---|---|---|
| 8,863,361 | B2 * | 10/2014 | Neukoetter | E05D 3/186 16/366 |
| 9,617,769 | B2 * | 4/2017 | Polo Friz | E05D 3/186 |
| 9,663,979 | B2 * | 5/2017 | Dreisewerd | E05D 7/0415 |
| 9,725,939 | B2 * | 8/2017 | Adair | E05D 11/0081 |
| 9,822,564 | B2 * | 11/2017 | Dreisewerd | E05D 7/04 |
| 9,976,327 | B2 * | 5/2018 | Dreisewerd | E05D 3/06 |
| 11,421,457 | B2 * | 8/2022 | Dreisewerd | E05D 3/14 |
| 2004/0211035 | A1 * | 10/2004 | Glover | E05D 3/186 16/221 |
| 2009/0241292 | A1 * | 10/2009 | Wang | E05D 3/183 16/221 |
| 2018/0238091 | A1 * | 8/2018 | Rodriguez Rodriguez | E05D 3/06 |
| 2019/0071905 | A1 * | 3/2019 | Migliorini | E05D 9/00 |
| 2023/0151655 | A1 * | 5/2023 | Liermann | E05D 3/06 16/233 |
| 2023/0151657 | A1 * | 5/2023 | Ellefred | E05D 3/186 16/358 |
| 2023/0151658 | A1 * | 5/2023 | Liermann | E05D 3/06 16/223 |
| 2023/0151659 | A1 * | 5/2023 | Liermann | E05D 11/0027 16/233 |
| 2023/0151660 | A1 * | 5/2023 | Liermann | E05D 3/186 16/233 |
| 2023/0151661 | A1 * | 5/2023 | Liermann | E05D 7/0415 16/221 |
| 2023/0279898 | A1 * | 9/2023 | Liu | F16C 11/04 361/807 |
| 2023/0383786 | A1 * | 11/2023 | Ren | E05D 3/16 |

* cited by examiner

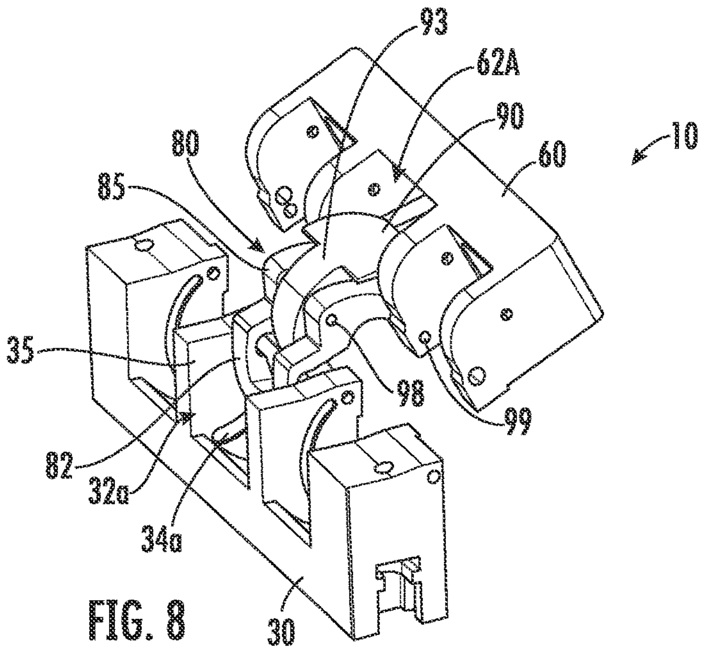
FIG. 8
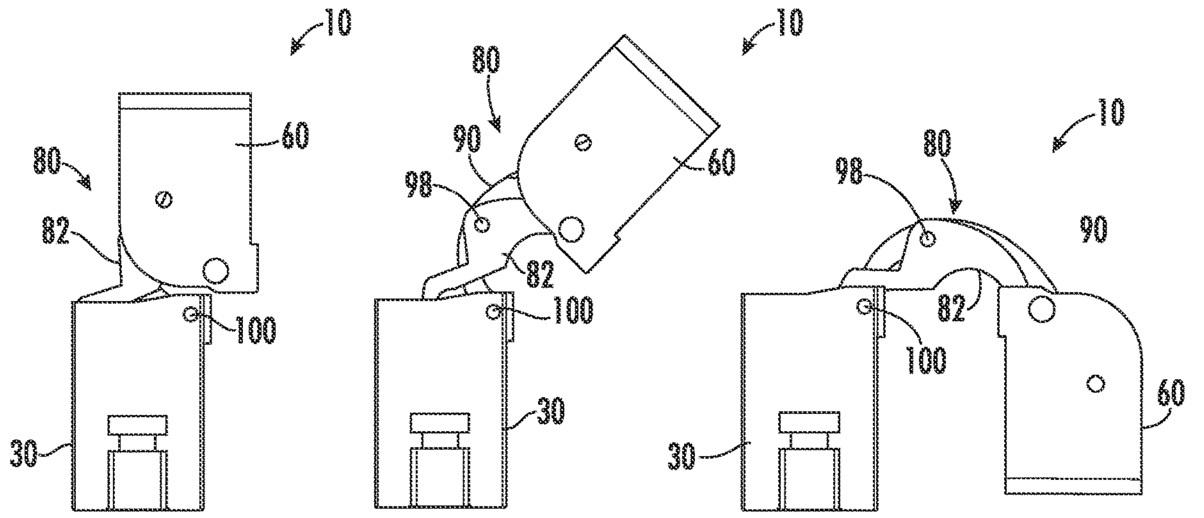
FIG. 9
FIG. 10
FIG. 11

3-D ADJUSTABLE HIDDEN HINGE FOR FLUSH OR REBATED DOOR OR WINDOW APPLICATIONS

TECHNICAL FIELD

The present invention relates to a door or window hinge, and more particularly to a hidden or invisible hinge that can be used for both flush or rebated door or window applications.

BACKGROUND

Hidden hinges are known for mounting either a door or sash to a frame. However, different types of hinges are typically used for mounting rebated doors or sashes in comparison to flush mounted doors or sashes. This is due to the overlapping edge of the rebated door or sash which has to be accounted for in the hinge movement in order to lift this off and away from the frame, while at the same time moving it back from the opening so that this overlapping edge is moved away from the clear opening in the frame.

The known prior art hinges are all generally only suitable for a single application, either rebated or flush mounting of the door or sash, and cannot be used in the other application.

These hinges also allow for adjustment in 3 directions in a simple and convenient manner such that a precise side-to-side and up-and-down alignment of the door panel or sash parallel to the corresponding frame can be achieved for proper positioning as well as an in-and-out adjustment for proper sealing.

It would be desirable to provide hinge of the above-noted type that can be used for both flush mounted and rebated door or window sashes. It would also be desirable to provide for simplified installation and adjustment.

SUMMARY

A hinge for mounting a door-panel or window sash to a frame is provided that addresses the issues noted above. The hinge includes a frame part adapted to be fixed to the frame, that has a frame mounting part having a cavity, a frame body mounted in the cavity, with the frame body including a first recess and a second recess. The hinge further includes a door or sash part adapted to be fixed to the door or sash, that has a movable door or sash mounting part, a sash body connected to the movable door or sash mounting part, and a sash movable body slidably mounted by a slidable mounting arrangement on the sash body, the sash movable body including a first recess and a second recess. (While these are referenced as “sash” parts for ease of reference, it is understood that they can be used for a sash or a door.) A rotational lever-arm system is connected between the frame body and the sash movable body that is at least partially located in the first recesses of the frame body and the sash movable body. The rotational lever-arm system includes a frame lever-arm including a FB side and a SMB side and a medial position located at a point between the FB side and the SMB side, and a sash lever-arm including a FB side and a SMB side and a medial position located at a point between the FB side and the SMB side of the sash lever-arm. A rotational pin connects the frame lever-arm at the frame lever-arm medial position to the sash lever-arm at the sash lever-arm medial position for pivoting movement. A first rotational arm pin pivotally connects the SMB side of the frame lever-arm to the sash movable body. A second rotational arm pin pivotally connects the FB side of the sash lever-arm to the frame body. A FB guide projection on the FB side of the frame lever-arm is received in a FB rotation guide groove in the first recess of the frame body, and a SMB guide projection on the SMB side of the sash lever-arm is received in a SMB rotation guide groove in the first recess of the sash movable body. A first translational arm system is also connected between the frame body, the movable sash body, and the sash body, with the first translational arm system being at least partially located in the second recesses of the frame body and the sash movable body and including a translational first lever-arm having a first end and a second end, a translational second lever-arm having a FB side and a SB side, with a translational FB guide projection located on the FB side of the translational second lever-arm. A translational first lever-arm pivot connection point is located between the FB side and the SB side of the translational second lever-arm, and a sash body pivot connection point is located at the SB side. A first translational pin pivotably connects the first end of the translational first lever-arm to the translational first lever-arm pivot connection point on the translational second lever-arm. A second translational pin pivotably connects the second end of the translational first lever-arm to the sash movable body. A third translational pin pivotably connects the sash body pivot connection point of the translational second lever-arm to the sash body. The translational guide projection on the FB side of the translational second lever-arm is received in a translational guide groove in the second recess of the frame body. The first, second, and third translational pins and the first and second rotational arm pins extend along axes that are parallel to one another. The use of both a rotational arm system as well as a translational arm system allows the hinge to be used in both rebated and flush mount applications.

The sash body is preferably adjustably connected to the movable door or sash mounting part to allow for relative movement that is adapted to adjust a gasket pressure of a movable door or sash connected to a frame by the hinge.

In one arrangement, the sash movable body includes a third recess, and the first recess of the sash movable body is located between the second and third recesses of the sash movable body. The frame body includes a third recess, and the first recess of the frame body is located the second and third recesses of the frame body, and the first, second, and third recesses of the sash movable body being aligned respectively with the first, second, and third recesses of the frame body. A second translational arm system is connected between the frame body, the sash movable body and the sash body, and the second translational arm system is at least partially located in the third recesses of the frame body and the sash movable body. The second translational arm system is identical to the first translational arm system.

In one embodiment, the slidable mount of the sash movable body on the sash body is formed by first and second posts on the sash body that extend parallel to one another into first and second channels that are defined through a base of the sash movable body with a sliding fit, and extend into the second and third recesses. The first and second posts include post pivot attachment ends that extend into the second and third recesses, and the third translational pin of each of the first and second translational arm systems are connected respectively to the sash body at the post pivot attachment ends of the first and second posts.

The hinge is movable from a closed position, in which the sash body and the frame body are generally aligned with one another, the sash movable body being in an inserted position in the sash body, and the first, second, and third recesses of the sash movable body and the first, second, and third recesses of the frame being aligned with and facing one another with the rotational lever-arm system and the first and second translational arm systems located in the respective sets of the first, second, and third recesses of the sash movable body and the frame body, to an open position, in which the sash body and the frame body are adjacent to one another, the sash movable body is moved to an extended position out from the sash body, and the frame and sash lever-arms as well as the translational second lever-arms are extended from the respective recesses. This provides for a hinge arrangement that can either be used in rebated or flush mount applications.

In a preferred arrangement, movement of the hinge toward the open position causes the translational first lever-arms acting on the sash movable body in conjunction with movement of the translational second lever-arms that pivot about the third translational pins that connect the sash body pivot connection points of the translational second lever-arms to the sash body, to move the sash movable body to the extended position.

Preferably, there are two of the FB guide projections located on opposite edges of the FB side of the frame lever-arm and there are two of the FB rotation guide grooves located in opposite walls of the first recess of the frame body, with each of the FB guide projections being located in a respective one of the FB rotation guide grooves. Preferably, the FB rotation guide grooves extend generally linearly, parallel to one another in the opposite walls of the first recess of the frame body. As used herein, the term generally refers to +/−10% of a value, or +/−10 degrees of an angle. With respect to a linear path, variations within a range of +/−2 mm of an ideal line are permitted.

In one embodiment, there are two of the SMB guide projections located on opposite edges of the SMB side of the sash lever-arm and there are two of the SMB rotation guide grooves located in opposite walls of the first recess of the sash movable body, with each of the SMB guide projections being located in a respective one of the SMB rotation guide grooves. Preferably, the SMB guide grooves extend generally linearly, parallel to one another in the opposite walls of the first recess of the sash movable body.

In one embodiment, there are two of the translational guide projections located on opposite edges of the FB side of the translational second lever-arm and there are two of the translational guide grooves on opposite walls of the second recess, with each of the translational guide projections being located in a respective one of the translational guide grooves. Preferably, the translational guide grooves extend parallel to one another with a curved path in the opposite walls of the second recess.

Preferably, the frame body is adjustably mounted in the frame mounting part. This preferably allows for both up-and-down as well as side-to-side adjustment for centering of the sash or door in the frame.

In one arrangement, the frame lever-arm includes a slot between the FB side and the SMB side, the sash lever-arm extends through the slot, and the connection of the frame lever-arm at the frame lever-arm medial position to the sash lever-arm at the sash lever-arm medial position is in an area of the slot.

Further features of the invention are described below and can be used individually or in combination with various other features as described herein.

BRIEF DESCRIPTION OF THE DRAWING(S)

The foregoing summary as well as the following detailed description will be best understood when read in conjunction with the appended drawings. In the drawings:

FIG. 8 is a perspective view similar to FIG. 3 showing the rotational lever-arm system that connects the frame body and the sash movable body shown in a partly open position.

FIG. 9 is an end view showing the components of FIG. 8 in the closed position.

FIG. 10 is an end view showing the components of FIG. 8 in a partially open position.

FIG. 11 is an end view showing the components of FIG. 8 in the open position.

DETAILED DESCRIPTION

Certain terminology is used in the following description for convenience only and is not limiting. “Axially” refers to a direction along the axis of the hinge pin. A reference to a list of items that are cited as “at least one of a, b, or c” (where a, b, and c represent the items being listed) means any single one of the items a, b, or c, or combinations thereof. The term “generally” has the meaning noted above. Reference to certain components as “sash” components is for convenience only in this description, and it is understood that these components can be used for a sash or a door. The terminology includes the words specifically noted above, derivatives thereof and words of similar import.

Figure 1:
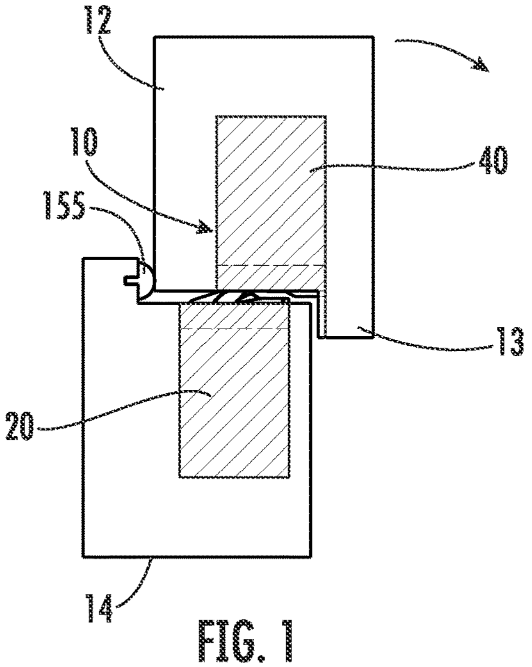
FIG. 1 is a cross-sectional view through a rebated mounting of a window or door sash to a frame via a hinge according to an embodiment of this application.
Figure 2:
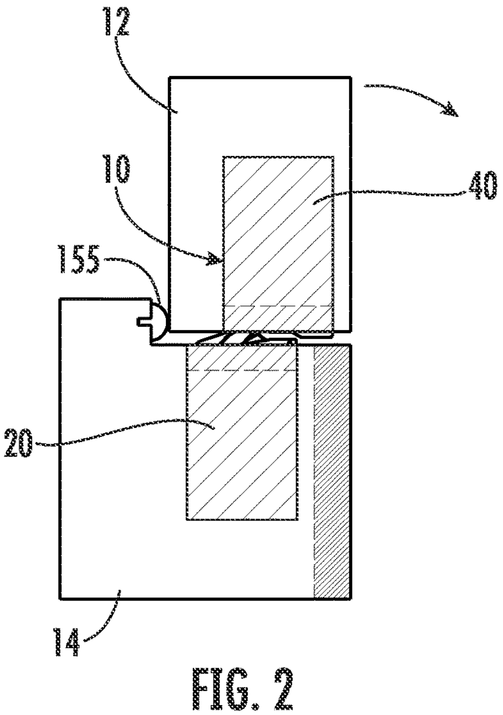
FIG. 2 is a cross-sectional view through a flush mount of a door or window sash to a frame using the same hinge according to the embodiment of the present application used for a rebated mounting.

Referring to FIGS. 1 and 2, a hinge 10 for mounting a door or window sash 12 to a frame 14 is shown with two different mounting configurations for the same hinge 10. FIG. 1 shows a rebated mount in which the door or window sash 12 includes a lip 13 that overlaps the frame 14 in the closed position. FIG. 2 shows a flush mount in which the door or window sash 12 sits flush with the frame 14 when the hinge 10 is in the closed position. An optional gasket 155 is shown between the door or window sash 12 and the frame 14. However, this could be omitted. It is noted that the dimensions in FIGS. 1 and 2 are exemplary and could be changed depending on the particular application.

FIGS. 3-6 show the hinge 10 fully assembled. The hinge 10 includes a frame part 20 that is adapted to be fixed to the frame 14 as well as a door or sash part 40 that is adapted to be fixed to the door or sash 12. These are connected by a rotational lever-arm system 80 as well as at least a first translational arm system 110. In a preferred arrangement a second translation arm system 110' is also provided that is connected between the frame part 20 and the door or sash part 40.

Figure 4:
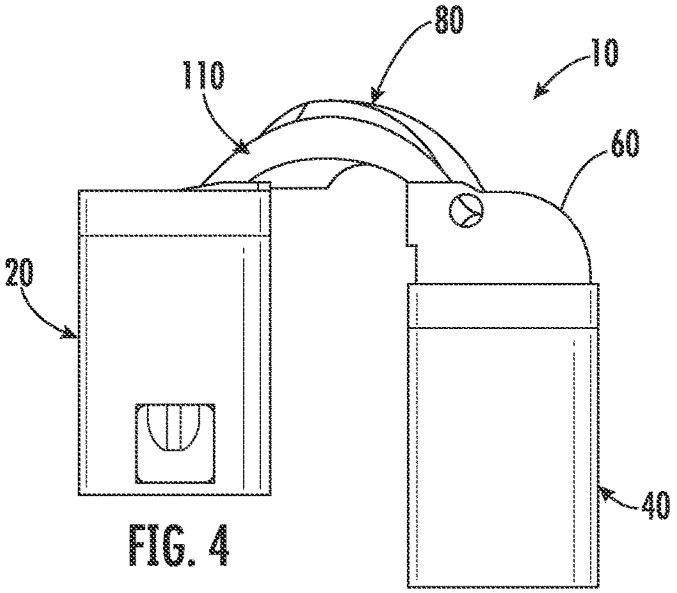
FIG. 4 is an end view of the hinge shown in FIG. 3 in the open position.
Figure 5:
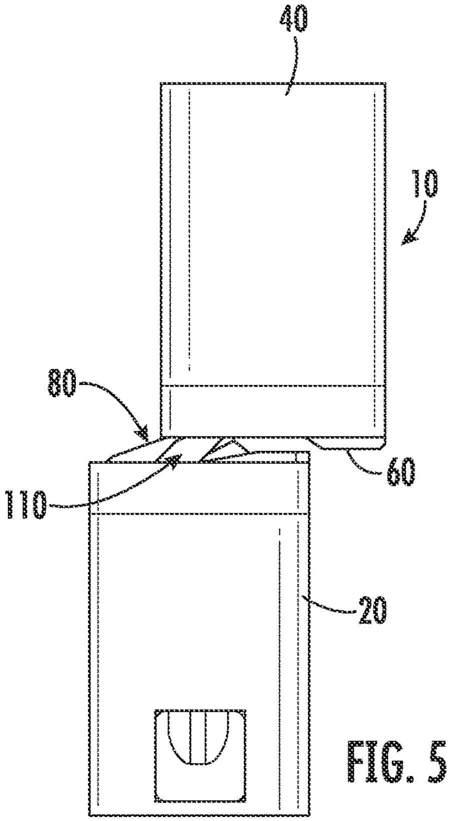
FIG. 5 is an end view of the hinge shown in FIG. 3 now in the closed position.
Figure 6:
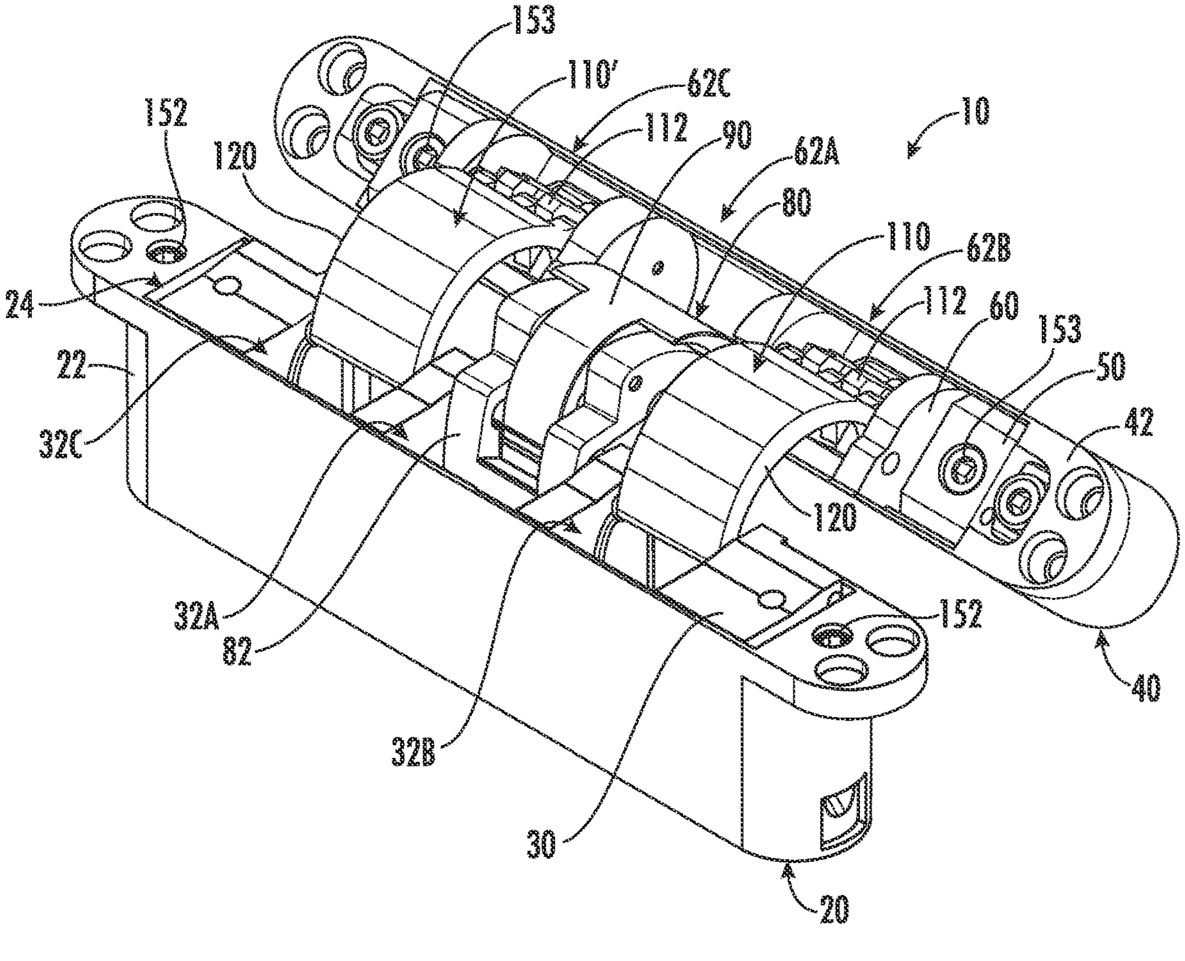
FIG. 6 is a perspective view similar to FIG. 3 showing the hinge in a transitional position between the open and closed positions.

FIG. 4 shows the hinge 10 in the open position while FIG. 5 shows the hinge 10 in the closed position. FIG. 6 shows the hinge 10 in a partially open position.

Figure 3:
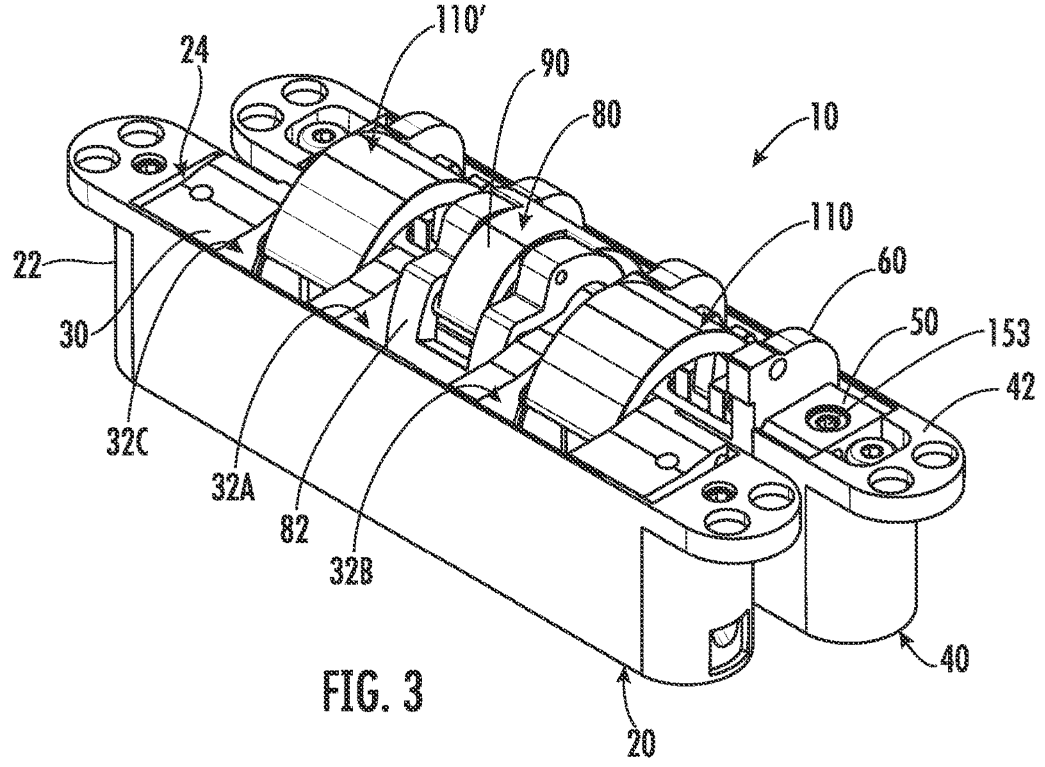
FIG. 3 is a perspective view of an embodiment of the hinge shown in an open position.

As shown in particular in FIGS. 3 and 6, the frame part 20 includes a frame mounting part 22 having a cavity 24 as well as a frame body 30 that is mounted in the cavity 24. The frame body 30 includes a first recess 32A as well as a second recess 32B. Preferably a third recess 32C is also provided however, this is optional.

The door sash part 40 includes a moveable door sash part 42 as well as a sash body 50 that is connected to the moveable door or sash part 42. A sash movable body 60 is slidably mounted, preferably by sliding mount arrangements 65 best shown in FIGS. 14 and 18-20, on the sash body 50. The sash moveable body 60 includes a first recess 62A and a second recess 62B. In a preferred arrangement, a third recess 62C is also provided on the sash moveable body 60.

As described in detail below, the rotational lever-arm system 80 is preferably arranged in the first recess 32A of the frame body 30 and the first recess 62A of the sash movable body 60. The first translational arm system 110 is preferably located in the second recess 32B of the frame body 30 as well as in the second recess 62B of the sash moveable body 60. When present, the second translational arm system 110' is preferably arranged in the third recess 32C of the frame body 30 and the third recess 62C of the sash moveable body 60.

Referring to FIGS. 7-13, the rotational lever-arm system 80 that is connected between the frame body 30 and the sash movable body 60 is described in detail. The rotational lever-arm system 80 provides for supported and guided rotational movement of the door or sash part 40 180° such that the door or sash part 40 is moved from a closed position which is generally aligned with the frame body 30, shown in FIG. 9, into an open position in which it is spaced apart from but adjacent to the frame body 30, shown in FIG. 11. In the closed position shown in FIG. 9, the rotational lever-arm system 80 is at least partially, and preferably almost entirely, located within the first recesses 32A, 62A of the frame body 30 and the sash moveable body 60, as shown in FIG. 9.

Figure 12:
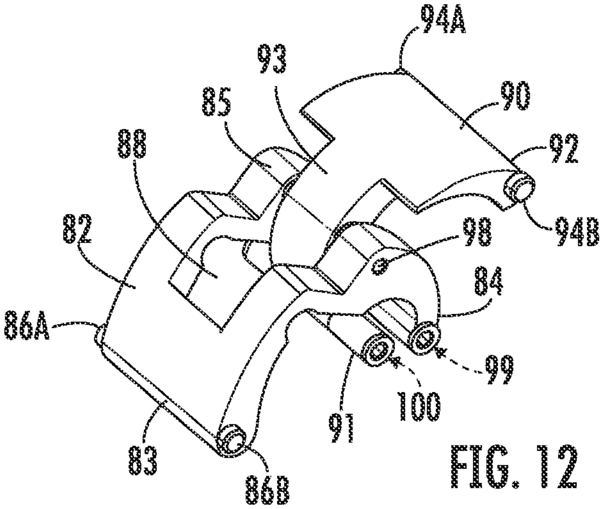
FIG. 12 is a detailed view of the rotational lever arm system frame lever-arm and sash lever-arm shown assembled to one another prior to being connected to the frame body and the sash movable body.
Figure 13:
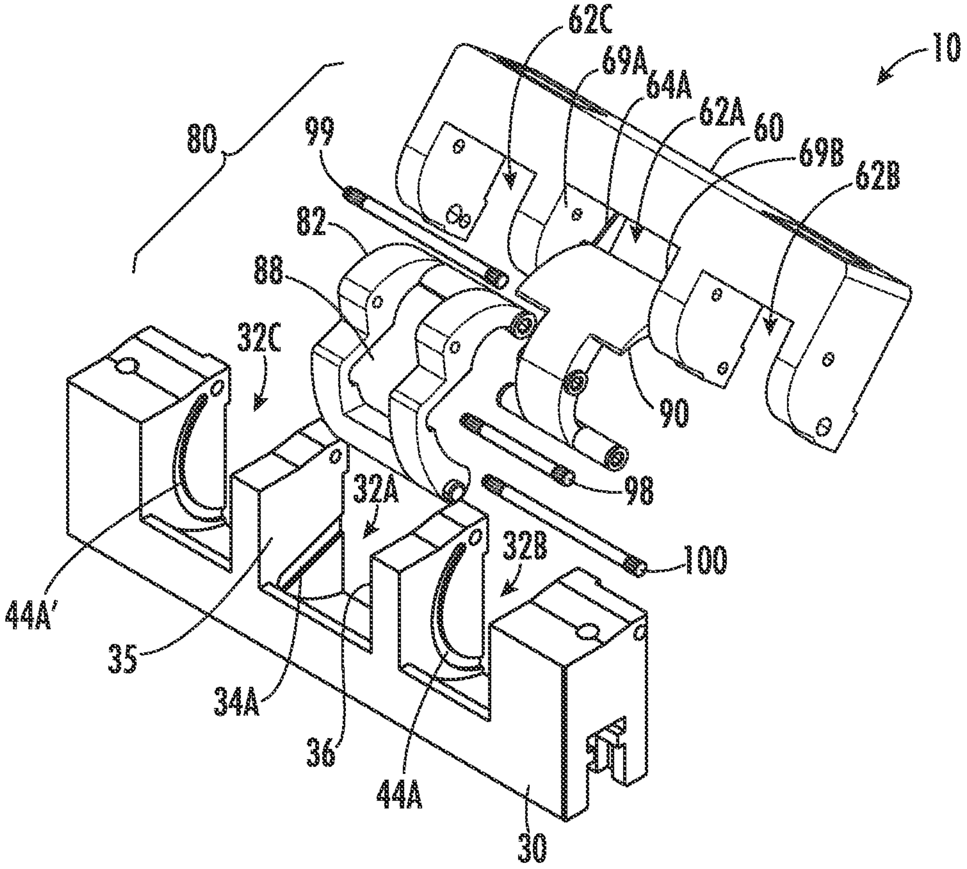
FIG. 13 is an exploded perspective view showing the components of the rotational lever-arm system from FIG. 8 in the disassembled state.

The rotational lever-arm system 80 includes a frame lever-arm 82, shown in detail in FIGS. 12 and 13, that includes a FB side 83 and an SMB side 84 as well as a medial position 85 located at a point between the FB side 83 and the SMB side 84. The rotational lever-arm system 80 further includes a sash lever-arm 90 including a FB side 91 and an SMB side 92 as well as a medial position 93 located at a point between the FB side 91 and the SMB side 92 of the sash lever-arm 90 is also provided. A rotational pin 98 connects the frame lever arm 82 at the frame lever-arm medial position 85 to the sash lever-arm 90 at the sash lever-arm medial position 93 for pivoting movement. Preferably, the frame lever-arm 82 includes a slot 88 between the FB side 83 and the SMB side 84, and the sash lever-arm 90 extends through the slot 88. The connection of the frame lever-arm 82 at the frame lever-arm medial position 85 to the sash lever-arm 90 at the sash lever-arm medial position 93 is in an area of this slot 88, as shown in detail in FIG. 12.

A first rotational arm pin 99 pivotally connects the SMB side 84 of the frame lever-arm 82 to the sash moveable body 60. A second rotational arm pin 100 pivotally connects the FB side 91 of the sash lever-arm 90 to the frame body 30. The locations of these first and second rotational arm pins 99 and 100 can be seen more clearly in FIG. 32 from the underside of the hinge 10.

Figure 7:
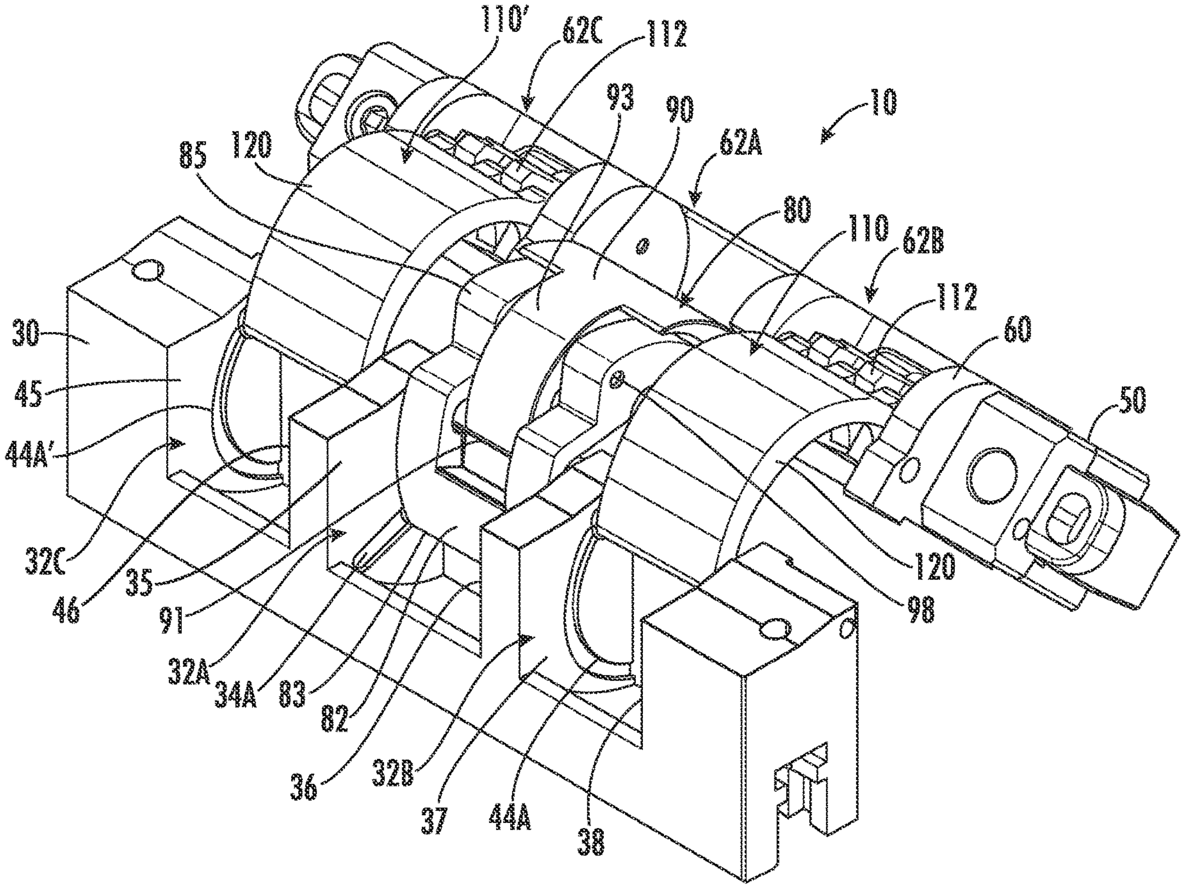
FIG. 7 is a perspective view similar to FIG. 6 showing the frame body, sash body and sash moveable body of the hinge shown in FIG. 3 removed from the frame mounting part and the moveable door or sash mounting part for additional clarity with respect to the components.

AFB guide projection 86A is located on the FB side 83 of the frame lever-arm 82 that is received in a FB guide groove 34A in the first recess 32A of the frame body 30. In a preferred arrangement, there are two of the FB guide projections 86A, 86B located on opposite edges on the FB side 83 of the frame lever-arm 82 and there are two of the FB rotational guide grooves 34A, 34B located in opposite walls 35, 36 of the first recess 32A of the frame body 30. See FIGS. 7 and 32. Each of the FB guide projections 86A, 86B is located in a respective one of the FB guide grooves 34A, 34B. This is shown most clearly in FIGS. 7, 8, and 32. As shown in these Figures, the FB guide grooves 34A, 34B extend generally linearly, parallel to one another in the opposite walls 35, 36 of the first recess 32A of the frame body 30. As shown in FIGS. 7 and 13, the groove is lower at a position away from the door or sash part 40 when in the open position and extends to a higher position at the side adjacent to the door sash part 40 in the open position.

Figure 25:
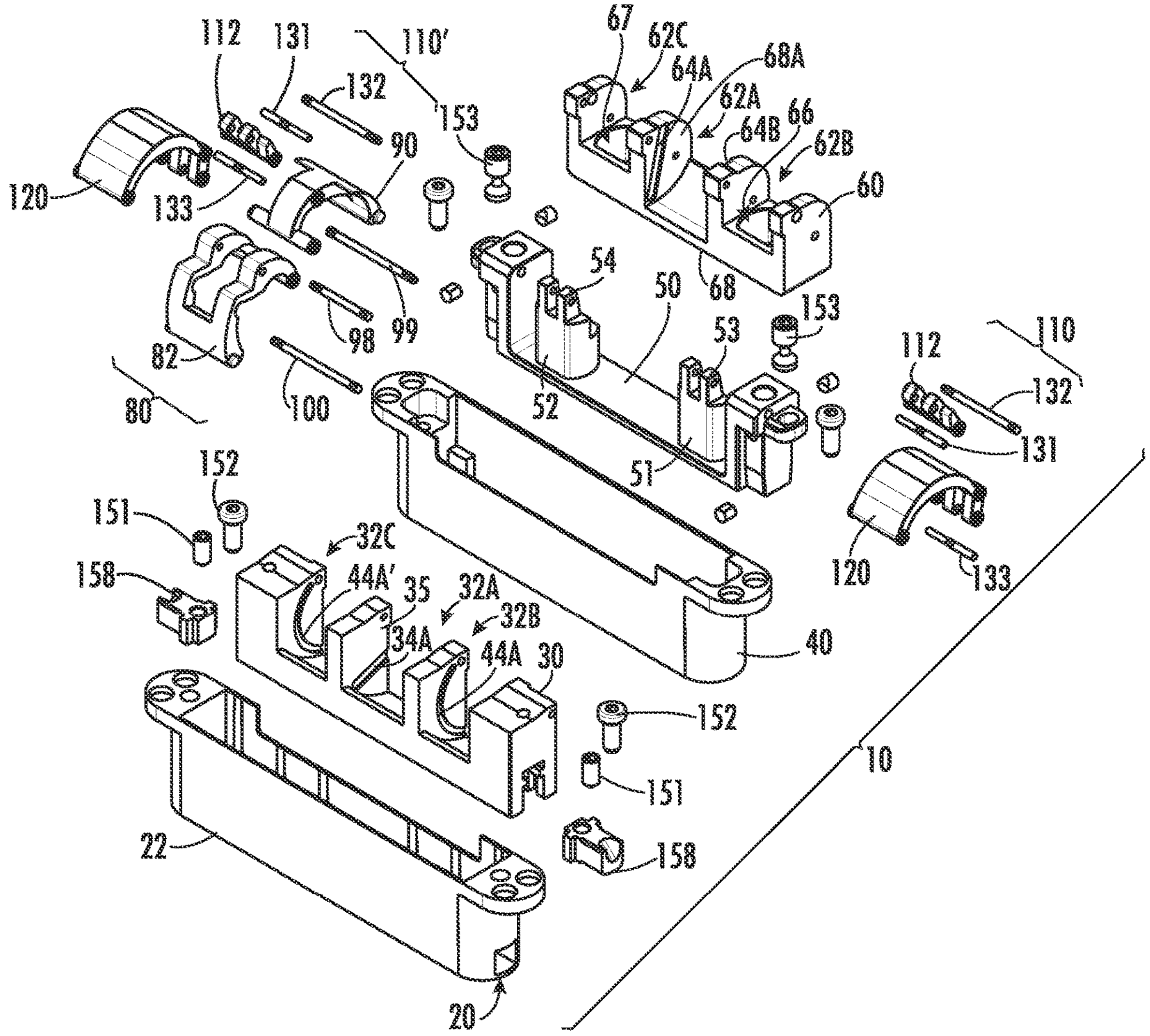
FIG. 25 is an exploded assembly view of the hinge shown in FIG. 3.
Figure 34:
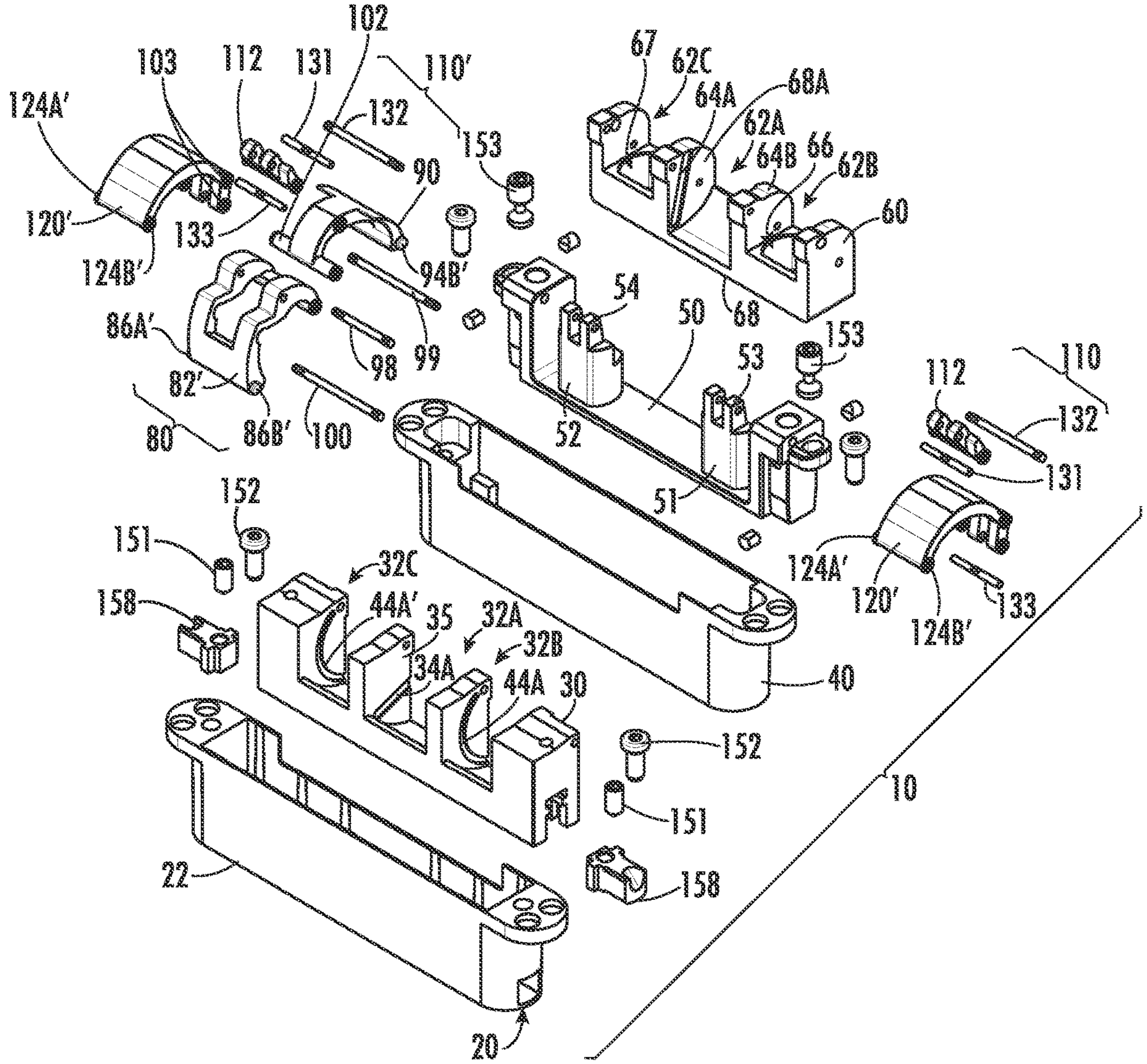
FIG. 34 is an exploded assembly view of the hinge similar to FIG. 25 with an alternate construction of the frame lever-arm, sash lever-arm, and the translational second lever-arm.
Figure 35:
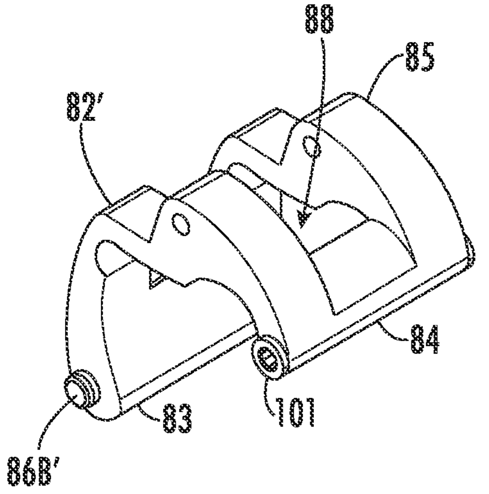
FIGS. 35 and 36 are perspective views of the alternate construction of the frame lever-arm.
Figure 36:
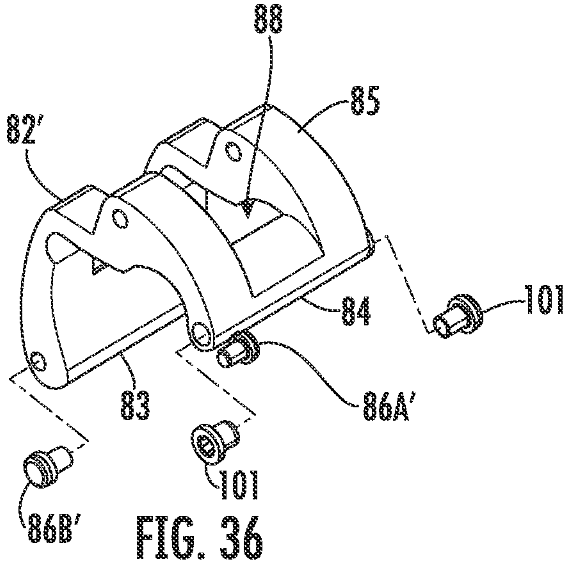

The FB guide projections 86A, 86B may be integral with the frame lever-arm 82 as shown in FIGS. 12 and 25. It is also possible to form the FB guide projections 86A', 86B' as separate inserts formed of a plastic bearing material, such as a polyamide, that are pressed into corresponding openings in the frame lever-arm 82', as shown in FIGS. 34-36, which can be used in the same manner as the frame lever-arm 82. The plastic bearing material can provide for smoother travel in the FB guide grooves 34A, 34B and longer wear.

Additionally, as shown in FIGS. 12, 35, and 36, plastic bearings 101, for example made of a polyamide, can also be pressed into openings in the SMB side 84 of the frame lever-arm 82, 82' where the first rotational arm pin 99 is inserted to provide for smoother movement and increased wear.

Figure 32:
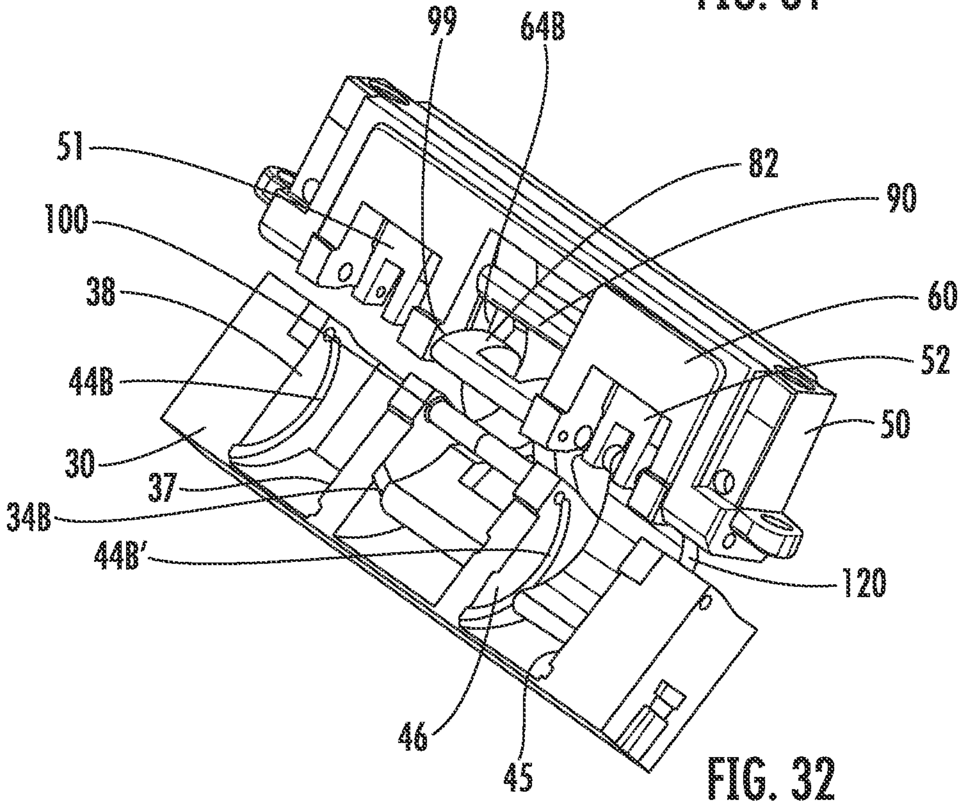
FIG. 32 is a perspective view showing the underside of the hinge in a partially open position.
Figure 33:
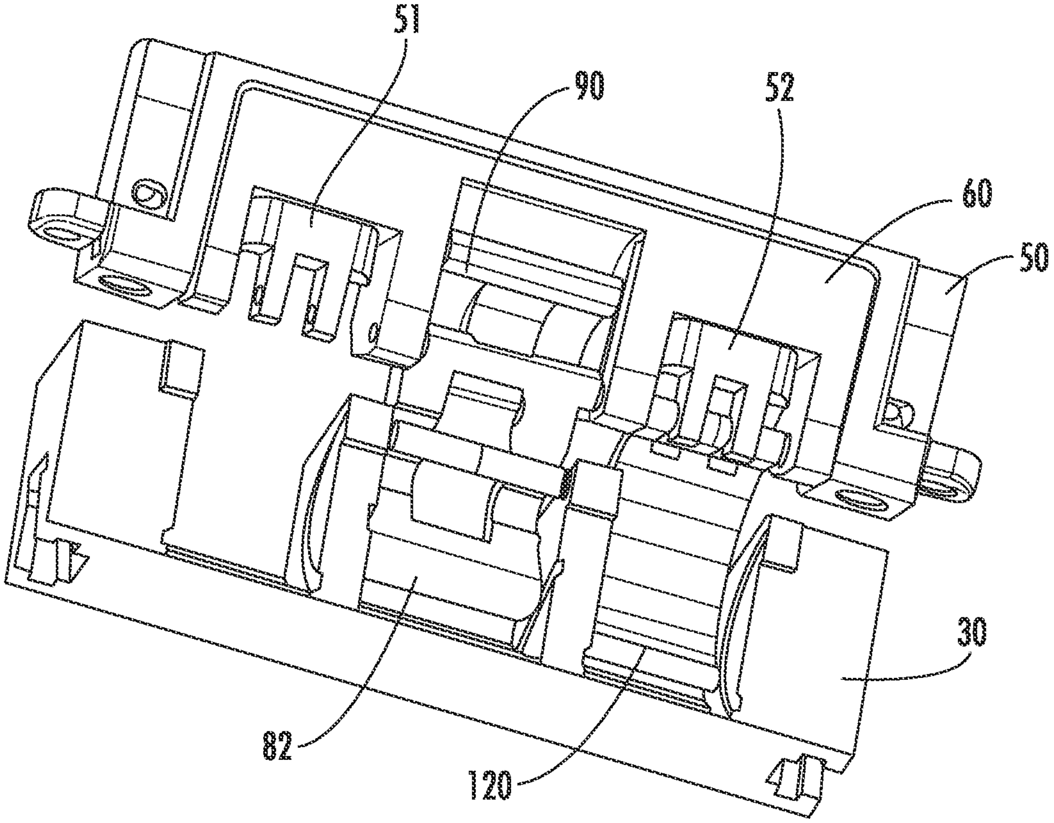
FIG. 33 is a perspective view showing the underside of the hinge in a closed position.

As shown best in FIGS. 13 and 32, a SMB guide projection 94A is located on the SMB side 92 of the sash lever-arm 90 that is received in a SMB rotation guide groove 64A in the first recess 62A of the sash moveable body 60. Preferably, there are two of the SMB guide projections 94A, 94B located on opposite edges of the SMB side 92 of the sash lever-arm 90 and there are two of the SMB rotation guide grooves 64A, 64B located in opposite walls 69A, 69B of the first recess 62A of the sash moveable body 60. Each of the SMB guide projections 94A, 94B is located in a respective one of the SMB rotation guide grooves 64A, 64B.

Figure 37:
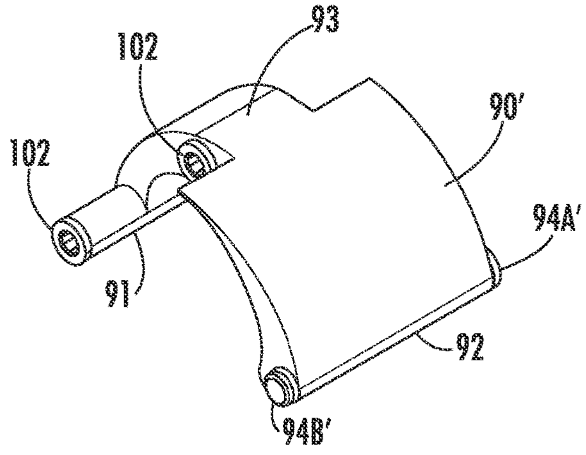
FIGS. 37 and 38 are perspective views of the alternate construction of the sash lever-arm.
Figure 38:
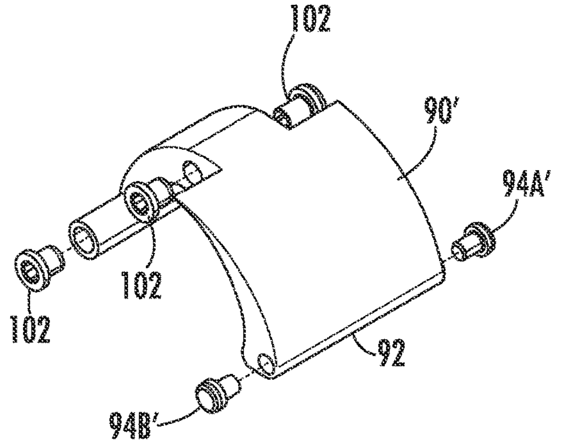

The SMB guide projections 94A, 94B may be integral with the sash lever-arm 90 as shown in FIGS. 12 and 25. It is also possible to form the SMB guide projections 94A', 94B' as separate inserts formed of a plastic bearing material, such as a polyamide, that are pressed into corresponding openings in the sash lever-arm 90', as shown in FIGS. 34, 37, and 38, which can be used in the same manner as the sash lever-arm 90. The plastic bearing material can provide for smoother travel in the SMB rotation guide grooves 64A, 64B and longer wear.

Additionally, as shown in FIGS. 12, 37, and 38, plastic bearings 102, for example made of a polyamide, can also be pressed into openings in the FB side 84 of the sash lever-arm 90, 90' where the second rotational arm pin 100 is inserted as well as at the location for the rotational pin 98 to provide for smoother movement and increased wear.

Figure 19:
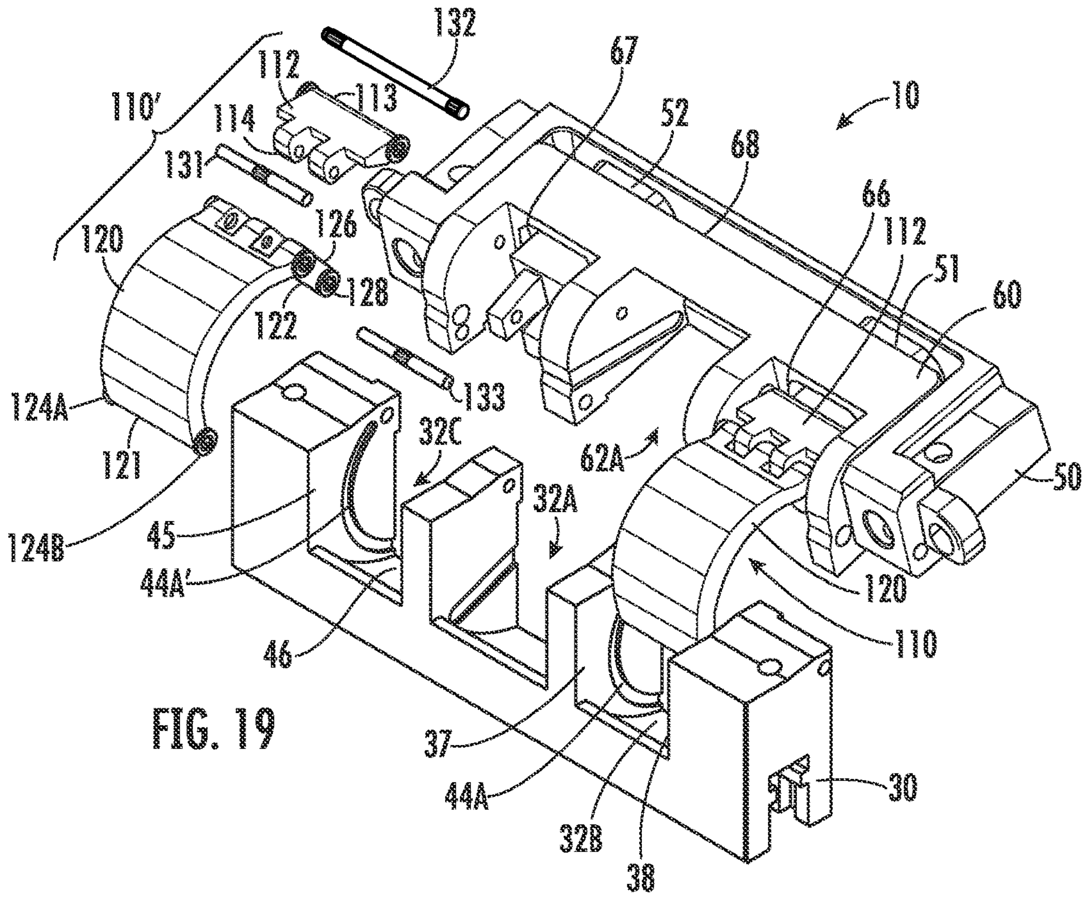
FIG. 19 is a perspective view similar to FIG. 14 showing a second translational arm system installed between the frame body, the movable sash body, and the sash body.

As shown in detail in FIGS. 8, 13, and 25, the SMB guide grooves 64A, 64B extend generally linearly, parallel to one another in the opposite side wall 69A, 69B of the first recess 62A of the sash movable body 60. As best seen in FIGS. 19 and 25, these SMB guide grooves 64A, 64B extend generally upwardly from the base 68 of the sash moveable body 60 toward an upper surface of the sash movable body 60.

The movement provided by the rotational lever-arm system 80 between the frame part 20 and the door or sash part 40 is a controlled rotation of 180° as shown in FIGS. 9-11 that is constrained by the first and second rotational arm pins 99, 100 as well as the FB guide projection 86A sliding in the FB rotation guide groove 34A and the SMB guide projection 94A sliding in the SMB rotation guide groove 64A while the frame lever-arm 82 and the sash lever-arm 90 pivot relative one another about the rotational pin 98.

Figure 14:
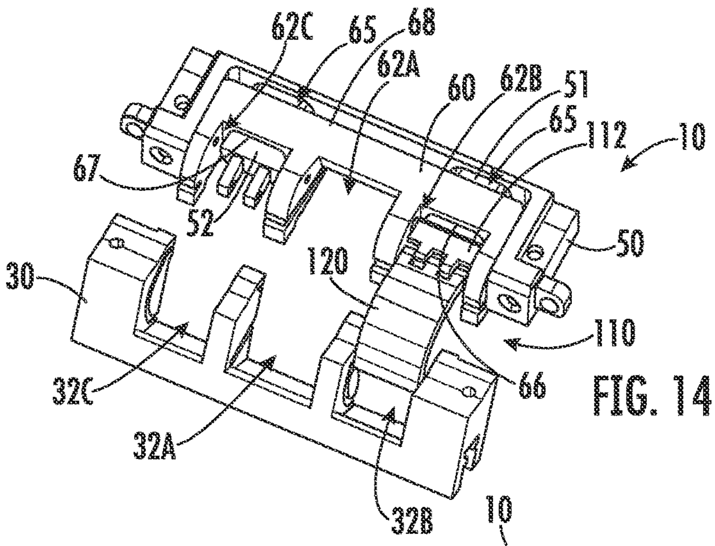
FIG. 14 is a perspective view showing the frame body, the movable sash body, and the sash body connected via a first translation arm system without the other hinge components.
Figure 15:
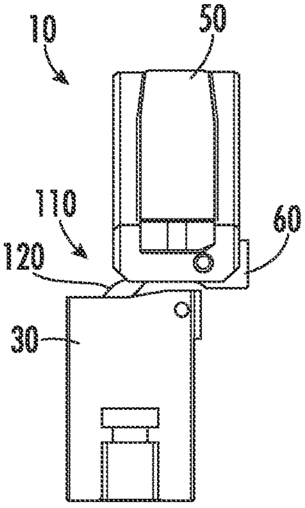
FIG. 15 is an end view showing that components of FIG. 14 in a closed position.
Figure 16:
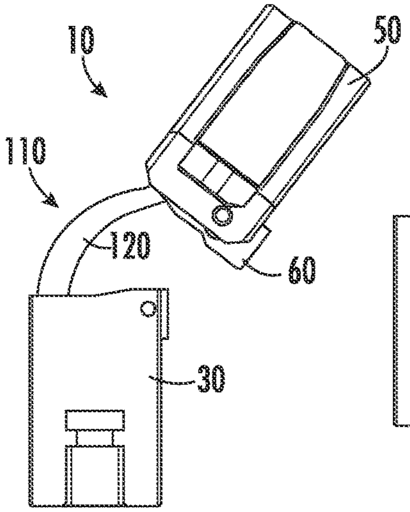
FIG. 16 is an end view showing the components of FIG. 14 in a partially open position.

Referring now to FIGS. 14-19, the first translational arm system 110 will be explained in detail. The first translation arm system 110 is connected between the frame body 30, the moveable sash body 60, and the sash body 50. As shown in FIG. 15, when the hinge 10 is in the closed position, the first translation arm system 110 is at least partially, and preferably mostly, located in the second recesses 32B, 62B of the frame body 30 and the sash moveable body 60.

The first translational arm system 110 includes a first translational arm lever-arm 112 having a first end 113 and a second end 114. A translational second lever-arm 120 is provided having an FB side 121 and an SB side 122. A translational FB guide projection 124A in located on the FB side 121 of the translational second lever-arm 120. Preferably, first and second FB guide projections 124A, 124B are located on opposite edges of the FB side 121 of the translation second lever-arm 120. A translational first lever-arm pivot connection point 126 is located between the FB side 121 and the SB side 122 side of the translational second lever-arm 120. A sash body pivot connection point 128 is located at the SB side 122.

A first translational pin 131 pivotally connects the first end 113 of the translation first lever-arm 112 to the translational first lever-arm pivot connection point 126 on the translational second lever-arm 120 and forms the pivot between the translational first and second lever-arms 112, 120. A second translational pin 132 pivotally connects the second end 114 of the translational first lever-arm 112 to the sash movable body 60. A third translational pin 133 pivotally connects the sash body pivot connection point 128 of the translational second lever-arm 120 to the sash body 50. Additionally, the translational guide projection 124 on the FB side of the second lever-arm 120 is received in a translational guide groove 44A in the second recess 32B of the frame body 30. Preferably, there are two of the translational guide grooves 44A, 44B on opposite walls 37, 38 of the second recess 32B, and each of the translational guide projections 124A, 124B is located in a respective one of the translational guide grooves 44A, 44B.

As shown in detail in FIGS. 19 and 25-27, the translational guide grooves 44A, 44B extend parallel to one another with a curved path in the opposite walls 37, 38 of the second recess 32B.

Figure 18:
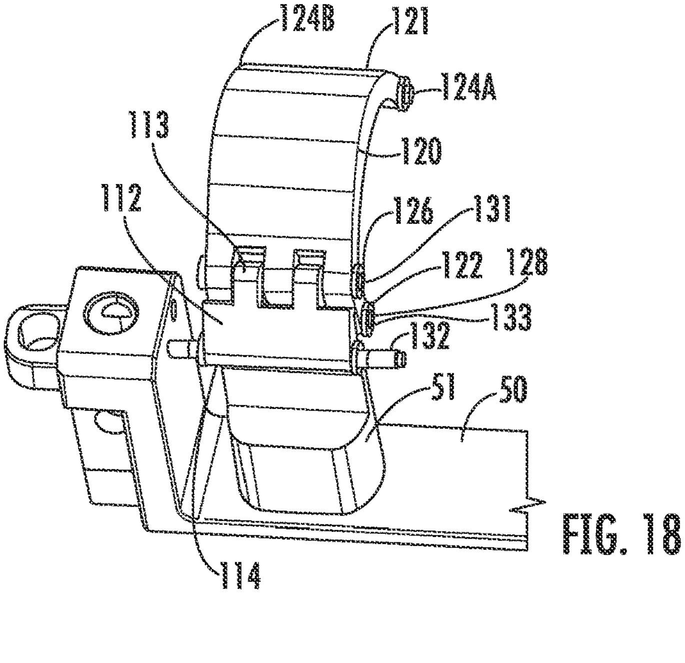
FIG. 18 is an enlarged detail view showing the connection of the first translational arm system to the sash moveable body.
Figure 39:
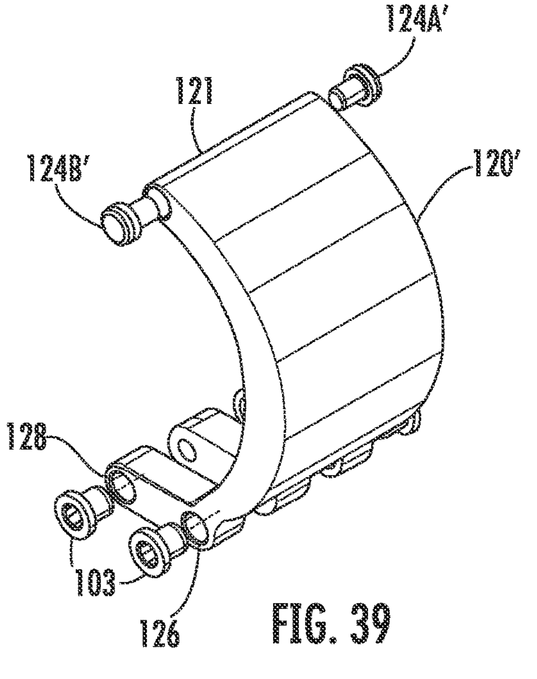
FIG. 39 is a perspective view of the alternate construction of the translational second lever-arm.

The FB guide projections 124A, 124B may be integral with the translational second lever-arm 120 or held in place via a pin as shown in FIGS. 18, 19, and 25. It is also possible to form the FB guide projections 124A', 124B' as separate inserts formed of a plastic bearing material, such as a polyamide, that are pressed into corresponding openings in the translational second lever-arm 120', as shown in FIGS. 34 and 39, which can be used in the same manner as the translational second lever-arm 120. The plastic bearing material can provide for smoother travel in the translational guide grooves 44A, 44B and longer wear.

Additionally, as shown in FIGS. 34 and 39, plastic bearings 103, for example made of a polyamide, can also be pressed into openings located at the translational first lever-arm pivot connection point 126 in the translational second lever-arm 120, 120' where the first translational pin 131 is inserted as well as at the sash body pivot connection point

128 of the translational second lever-arm 120, 120' where the third translational pin 133 is inserted to provide for smoother movement and increased wear.

Figure 17:
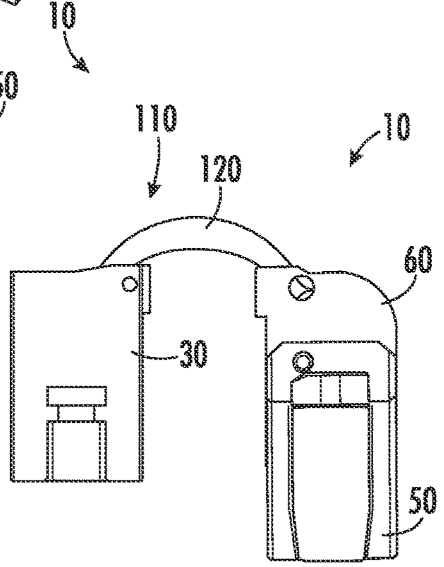
FIG. 17 is an end view showing the components of FIG. 14 in the open position of the hinge.

This arrangement of the first translational arm system acts in conjunction with the controlled rotational movement provided by the rotational lever-arm system 80 in order to extend the sash moveable body 60 from the sash body 50 as the hinge 10 moves from the closed position shown in FIG. 15 to the open position as shown in FIG. 17. This translational movement is created by the translational first lever-arm 112 acting as a lever to slide the sash moveable body 60 apart from the sash body 50 based on the movement provided by the translational second lever-arm 120 being pulled from its closed position when the hinge 10 is moved from the closed position to the open position.

Referring to FIG. 19, in the preferred arrangement the sash moveable body 60 includes the third recess 62C, and the first recess 62A of the sash moveable body 60 is located between the second recess 62B and the third recess 62C of the sash movable body 60. The frame body 30 also includes the third recess 32C and the first recess 32A of the frame body 30 is located between the second recess 32B and the third recess 32C of the frame body 30. The first, second, and third recesses 62A-C of the sash moveable body 60 are aligned respectively with the first, second, and third recesses 32A, 32C of the frame body 30.

A second translational arm system 110' is connected between the frame body 30, the sash moveable body 60, and the sash body 50. The second translational arm system 110' is at least partially located in the third recesses 32C, 62C of the frame body 30 and the sash movable body 60. The second translational arm system 110' is identical to the first translational arm system 110 and like parts are indicated with the same reference numbers in the drawings. In order to accommodate the second translational arm system 110', the frame body 30 includes translational guide grooves 44A', 44B' in the opposite walls 45, 46 of the third recess 32C which received the translational guide projections 124A, 124B on the FB side of the translational second lever-arm 120 of the second translational arm system 110'.

Figure 26:
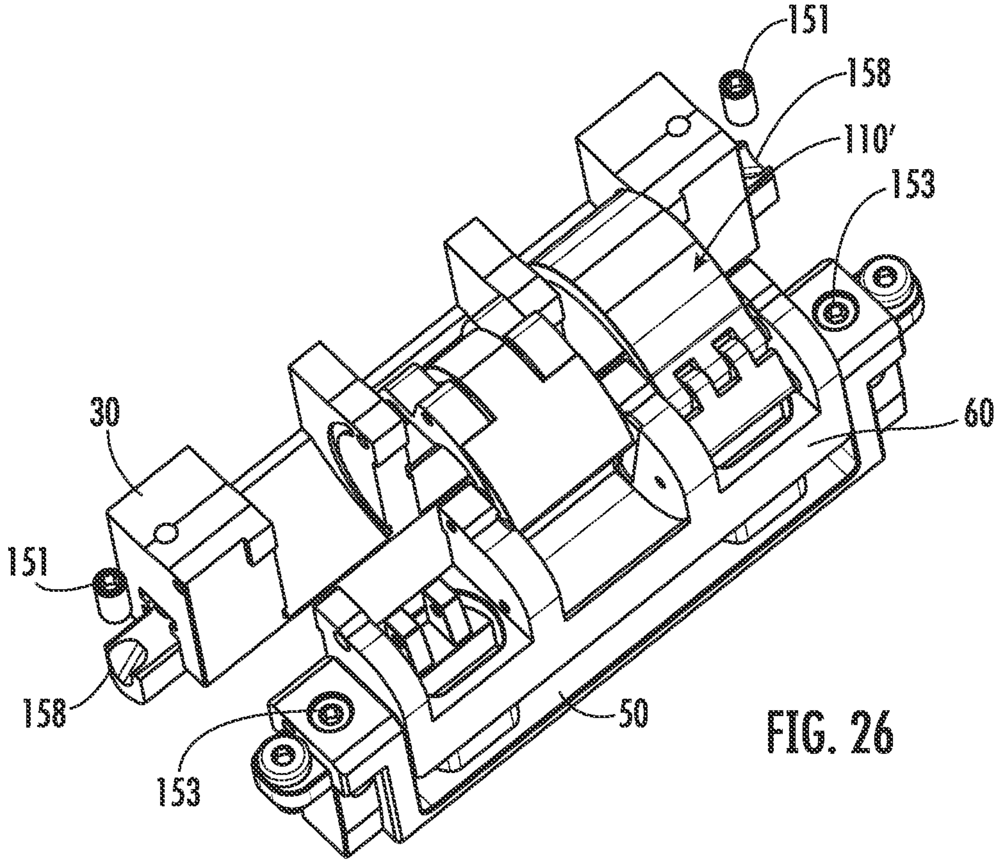
FIG. 26 is a perspective view showing the partially assembled hinge along with the up-and-down adjusters that act on the frame body as well as the gasket pressure adjusters located between the sash body and the moveable door or sash mounting part.
Figure 27:
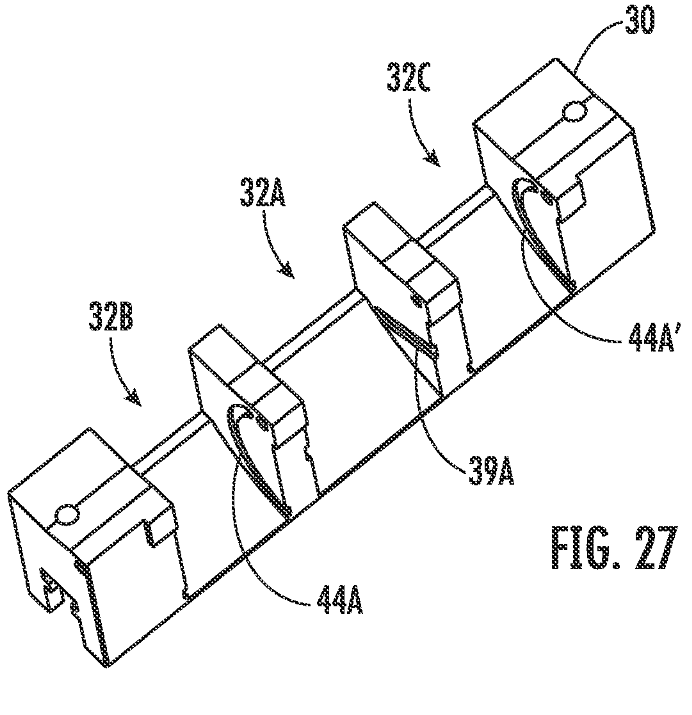
FIG. 27 is a detailed view showing the frame body.
Figure 28:
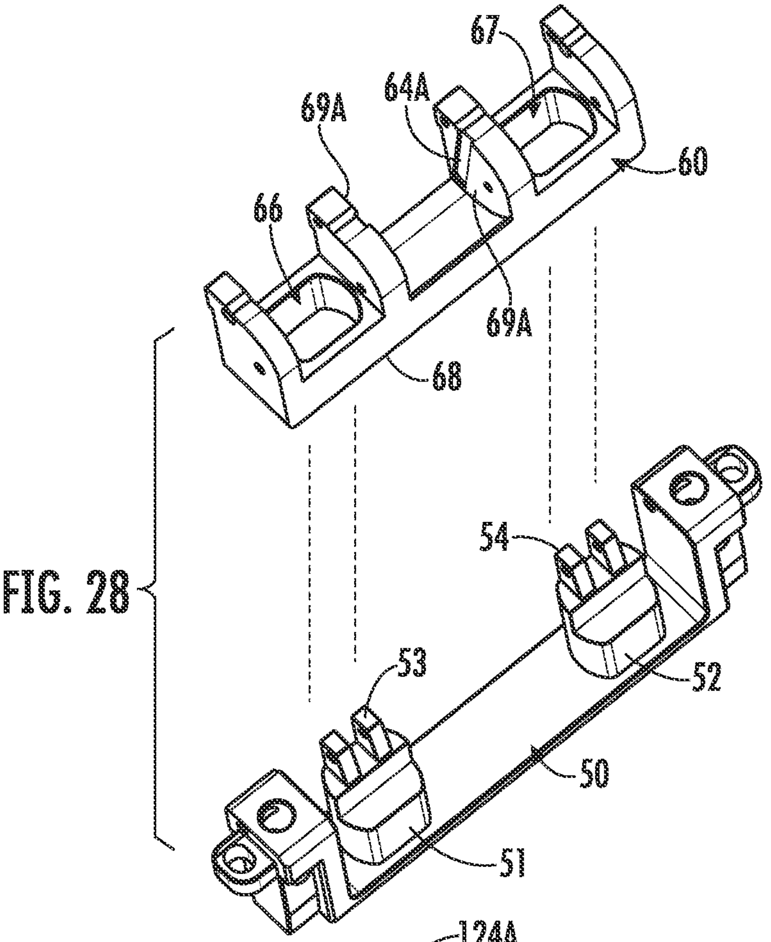
FIG. 28 is a detailed view showing the assembly of the sash body and the sash moveable body.
Figure 29:
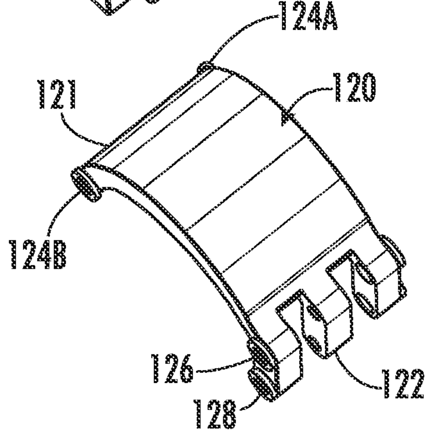
FIG. 29 is a detailed view showing the translational first-lever arm.
Figure 30:
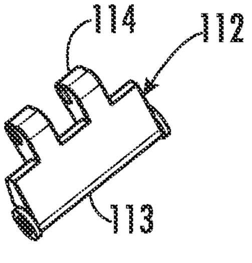
FIG. 30 is a detailed view of the translational second lever-arm.
Figure 31:
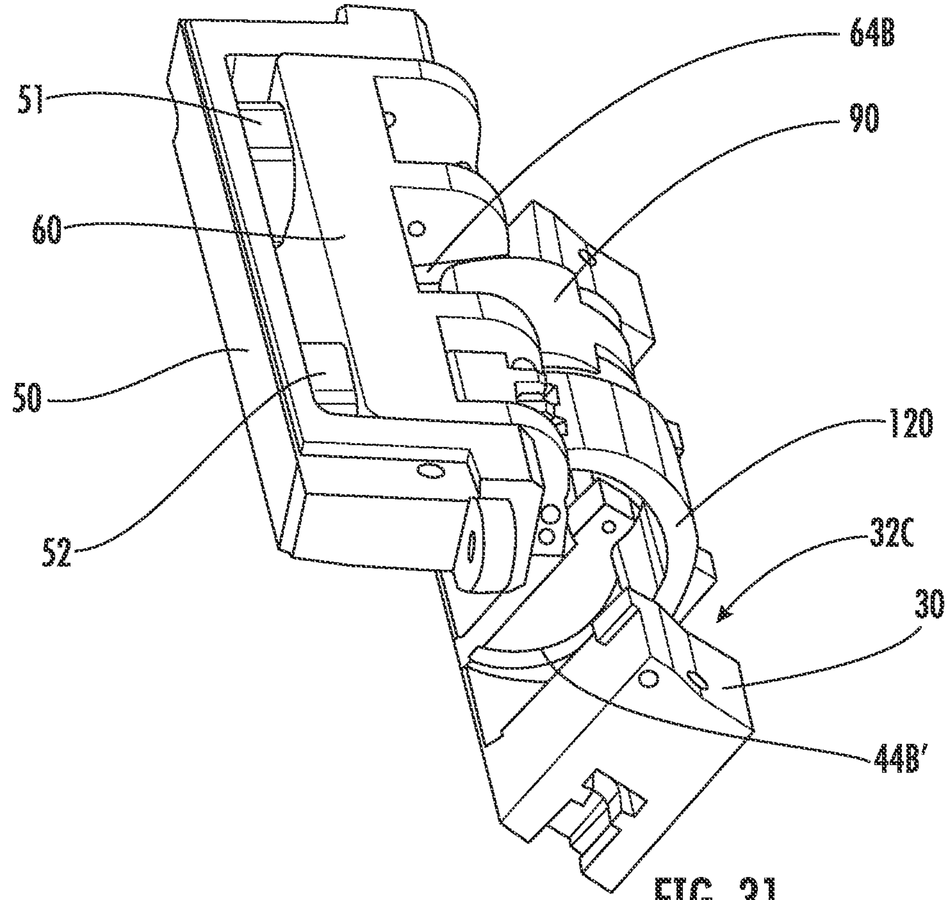
FIG. 31 is a perspective view showing a portion of the underside of the hinge in the partially open position.

The slidable mounting arrangement 65 between the sash movable body 60 and the sash body 50 is preferably formed by first and second posts 51, 52 on the sash body 50 that extend parallel to one another into first and second channels 66, 67 defined through the base 68 of the sash movable body with a sliding fit. This is best illustrated in FIGS. 14, 26, and 28. The first and second post 51, 52 include post pivot attachment ends 53, 54 that extend into the second and third recesses 62B, 62C of the sash movable body 60, and the third translational pin 133 of each of the first and second translational arm systems 110, 110' are connected respectively to the sash body 50 at the post pivot attachment ends 53, 54 of the first and second post 51, 52. This arrangement provides for a smooth sliding movement between the sash movable body 60 and the sash body 50 during the translational movement of the hinge 10.

Figure 20:
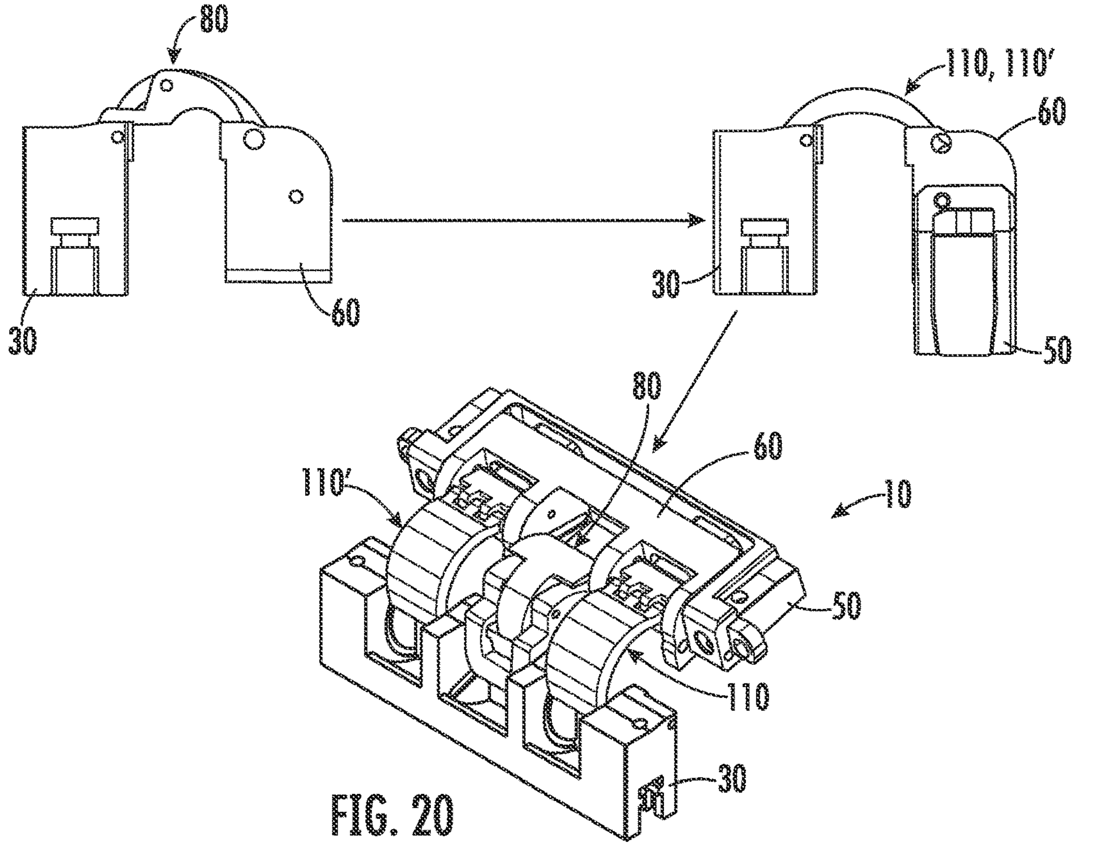
FIG. 20 is an explanatory view showing a combination of the end views for the rotational lever-arm system and the first and second translational arm systems forming the overall hinge which allows for both the rotational and transitional movement between the door or sash part and the frame part.
Figure 40:
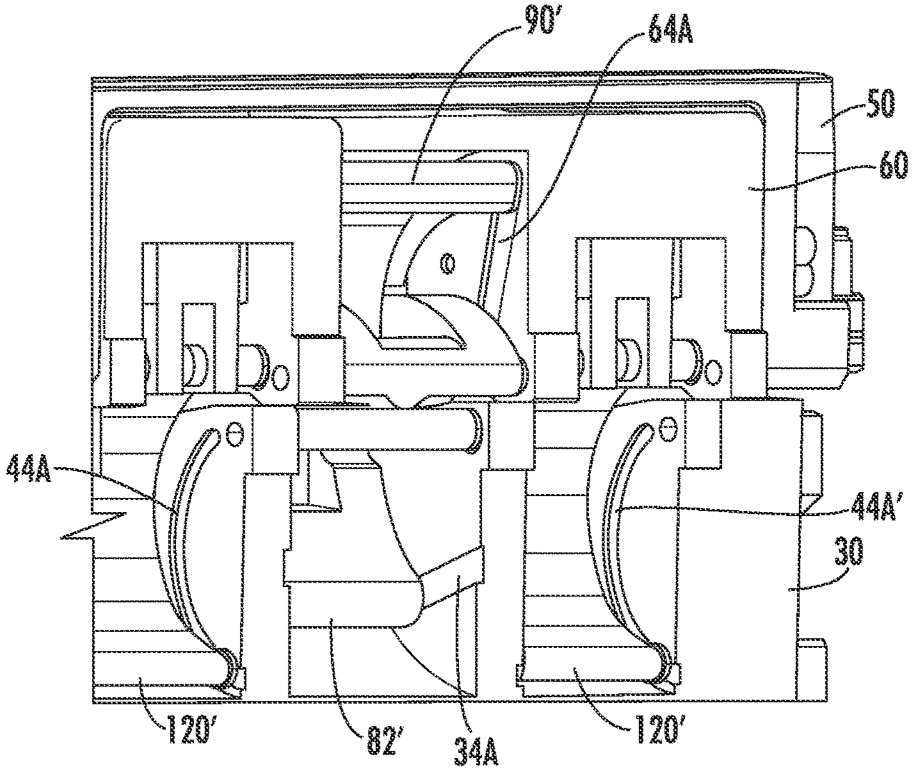
FIGS. 40 and 41 are perspective views of the underside of the hinge shown in FIG. 34 in the closed position.
Figure 41:
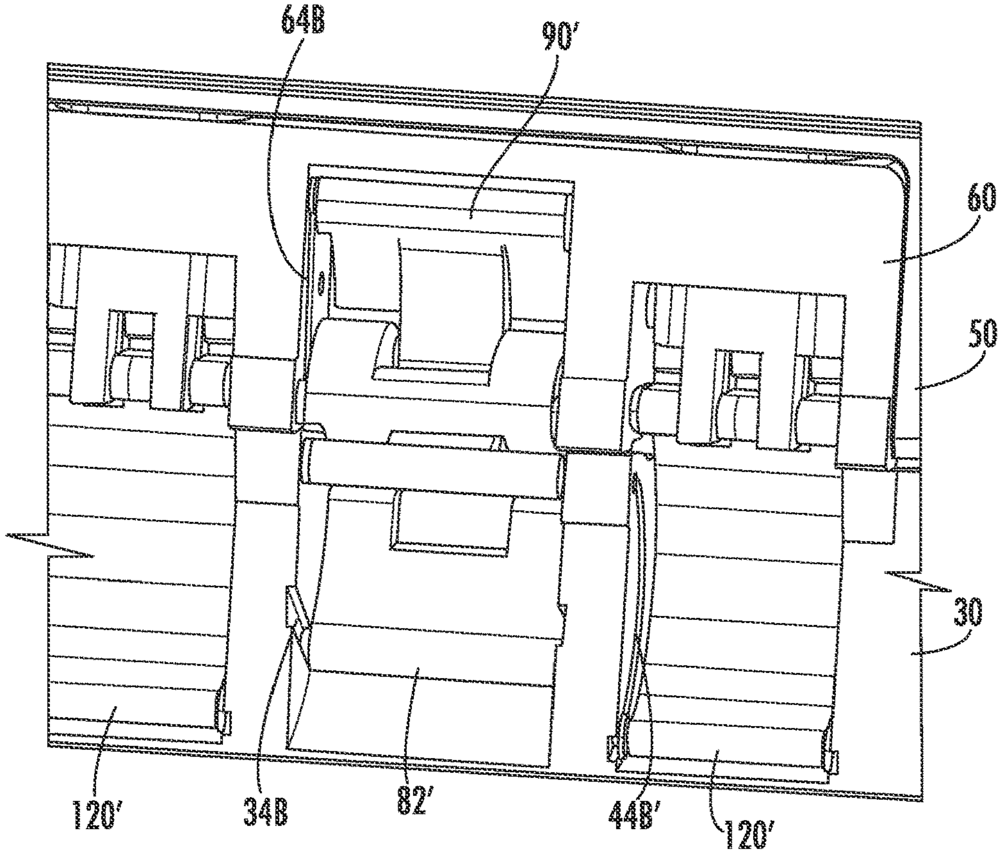

The hinge 10 is movable from a closed position in which the sash body 50 and the frame body 30 are generally aligned with one another, as shown in FIG. 5 (as well as FIGS. 40 and 41), with the sash movable body 60 being in an inserted position in the sash body 50, shown in FIG. 15 and FIG. 32, and the first, second, and third recesses 62A-C of the sash moveable body 60 and the first, second, and third recesses 32A-C of the frame 30 are aligned with and facing one another, with the rotational lever-arm system 80 and the first and second translational arm systems 110, 110' being located in the respective first, second, and third recesses, 32A-C; 62A-C of the frame body 30 and the sash movable body 60, to an open position, in which the sash body 50 and the frame body 30 are adjacent to one another, shown in FIG. 4, with the sash movable body 60 being moved to an extended position out from the sash body 50 and the frame and sash lever-arms 82, 90 as well as the translational second lever arms 120B extended from the respective recesses 32A-C; 62A-C. This movement of the hinge 10 toward the open position causes the translational first lever-arms 112 acting on the sash moveable body 60 in conjunction with movement of the translation second lever-arms 120 that pivot about the translational pins 133 that connect the sash body pivot connection points 128 of the translational second lever-arms 120 to the sash body 50, to move the sash movable body 60 to the extended position, as shown in FIGS. 17 and 20, with FIG. 20 representing the superimposed motion of the rotational lever-arm system 80 and the translational arm systems 110, 110'.

In order to allow this, the first, second, and third translational pins 131, 132, 133, as well as the second rotational arm pins 99, 100 extend along the axes that are parallel to one another.

Figure 21:
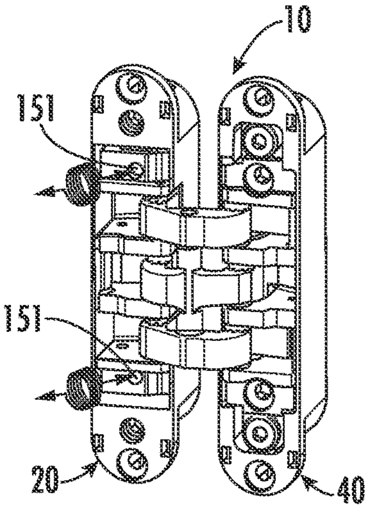
FIGS. 21-23 are schematic views showing a side-side adjustment (FIG. 21), an up-and-down adjustment (FIG. 22), and a gasket pressure adjustment (FIG. 23).
Figure 22:
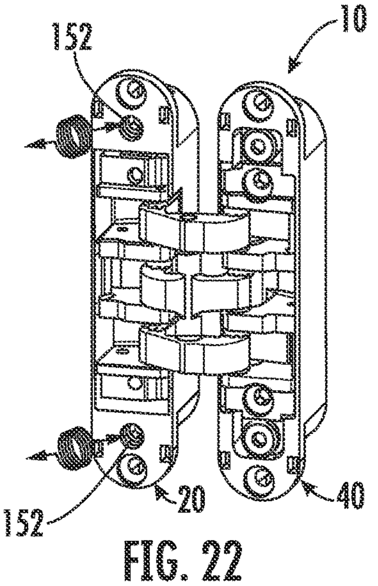
Figure 23:
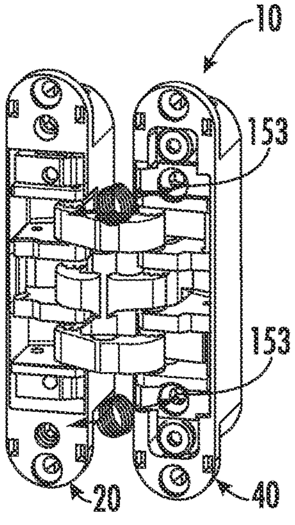
Figure 24:
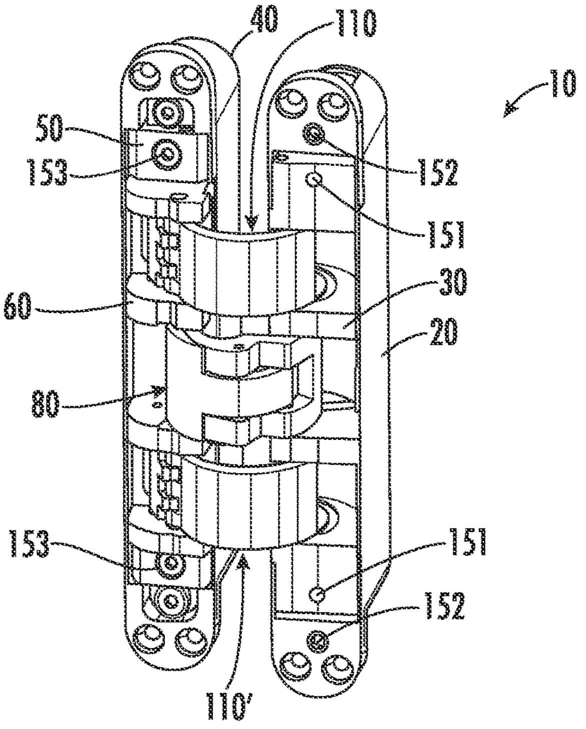
FIG. 24 is a perspective view of the hinge shown in FIG. 3 which provides a view looking in at the adjustments provided as shown in FIGS. 21-23.

Referring to FIGS. 21-25, the frame body 30 is adjustably mounted in the frame mounting part 24. Preferably, as shown in FIGS. 21 and 22, this is accomplished via adjuster screws. The adjuster screws 151 shown in FIGS. 21 and 24 allow for inward and outward movement of the frame body 30 relative to the frame mounting part 24 which effects a side-to-side (horizontal) movement of the door or window sash 12 for adjustment purposes. Adjustment of the adjustment screws 152 shown in FIG. 22 and FIG. 24 allows for an up-or-down movement of the frame body 30 relative to the frame mounting part 22, which is accomplished by the adjuster screws 152 moving up or down the inclined surfaces on parts 158 shown in detail in FIGS. 25 and 26 in order to effect the desired movement up or down.

Additionally, the sash body 50 is adjustably connected to the movable door sash mounting part 42 to allow for a relative movement that is adapted to adjust a gasket pressure of a movable door sash 12 connected to a frame 14 by the hinge 10. This is accomplished by adjuster screws 153 shown in FIGS. 23 and 24, that include an eccentric connected between the sash body 50 and the movable door or sash mounting part 42 in order to provide for inward or outward movement of the door or window sash 12 in the closed position in order to effect more or less pressure against the gasket 155 shown in FIGS. 1 and 2.

Having thus described various embodiments of the hinge in detail, it is to be appreciated and will be apparent to those skilled in the art that many physical changes, only a few of which are exemplified in the detailed description above, could be made in the apparatus without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

What is claimed is:

1. A hinge for mounting a door or window sash to a frame, the hinge comprising:

a frame part adapted to be fixed to the frame, the frame part including:

a frame mounting part having a cavity, a frame body mounted in the cavity, and the frame body including a first recess and a second recess;

a door or sash part adapted to be fixed to the door or sash, the door or sash part including:

a movable door or sash mounting part, a sash body connected to the movable door or sash mounting part, and a sash movable body slidably mounted by a slidable mounting arrangement on the sash body, the sash movable body including a first recess and a second recess;

a rotational lever-arm system connected between the frame body and the sash movable body that is at least partially located in the first recesses of the frame body and the sash movable body, the rotational lever-arm system including:

a frame lever-arm including a FB side and a SMB side and a medial position located at a point between the FB side and the SMB side, a sash lever-arm including a FB side and a SMB side and a medial position located at a point between the FB side and the SMB side of the sash lever-arm, a rotational pin connecting the frame lever-arm at the frame lever-arm medial position to the sash lever-arm at the sash lever-arm medial position for pivoting movement, a first rotational arm pin that pivotally connects the SMB side of the frame lever-arm to the sash movable body, a second rotational arm pin that pivotally connects the FB side of the sash lever-arm to the frame body, a FB guide projection on the FB side of the frame lever-arm that is received in a FB rotation guide groove in the first recess of the frame body, and a SMB guide projection on the SMB side of the sash lever-arm that is received in a SMB rotation guide groove in the first recess of the sash movable body;

a first translational arm system connected between the frame body, the sash movable body and the sash body, the first translational arm system being at least partially located in the second recesses of the frame body and the sash movable body and including:

a translational first lever-arm having a first end and a second end, a translational second lever-arm having a FB side and a SB side, a translational FB guide projection located on the FB side of the translational second lever-arm, a translational first lever-arm pivot connection point located between the FB side and the SB side of the translational second lever-arm, and a sash body pivot connection point located at the SB side, a first translational pin that pivotably connects the first end of the translational first lever-arm to the translational first lever-arm pivot connection point on the translational second lever-arm, a second translational pin that pivotably connects the second end of the translational first lever-arm to the sash movable body, a third translational pin that pivotably connects the sash body pivot connection point of the translational second lever-arm to the sash body, and the translational guide projection on the FB side of the translational second lever-arm is received in a translational guide groove in the second recess of the frame body; and wherein the first, second, and third translational pins and the first and second rotational arm pins extend along axes that are parallel to one another.

2. The hinge of claim 1, wherein the sash body is adjustably connected to the movable door or sash mounting part to allow for relative movement that is adapted to adjust a gasket pressure of a movable door or sash connected to a frame by the hinge.

3. The hinge of claim 1, wherein the sash movable body includes a third recess, and the first recess of the sash movable body is located between the second and third recesses of the sash movable body, the frame body includes a third recess, and the first recess of the frame body is located the second and third recesses of the frame body, the first, second, and third recesses of the sash movable body being aligned respectively with the first, second, and third recesses of the frame body, a second translational arm system is connected between the frame body, the sash movable body and the sash body, and the second translational arm system is at least partially located in the third recesses of the frame body and the sash movable body, the second translational arm system being identical to the first translational arm system.

4. The hinge of claim 3, wherein the slidable mount of the sash movable body on the sash body is formed by first and second posts on the sash body that extend parallel to one another into first and second channels that defined through a base of the sash movable body with a sliding fit, and extend into the second and third recesses, the first and second posts include post pivot attachment ends that extend into the second and third recesses, and the third translational pin of each of the first and second translational arm systems are connected respectively to the sash body at the post pivot attachment ends of the first and second posts.

5. The hinge of claim 4, wherein the hinge is movable from a closed position, in which the sash body and the frame body are generally aligned with one another, the sash movable body being in an inserted position in the sash body, and the first, second, and third recesses of the sash movable body and the first, second, and third recesses of the frame being aligned with and facing one another with the rotational lever-arm system and the first and second translational arm systems located in the respective sets of the first, second, and third recesses of the sash movable body and the frame body, to an open position, in which the sash body and the frame body are adjacent to one another, the sash movable body is moved to an extended position out from the sash body and the frame and sash lever-arms as well as the translational second lever-arms are extended from the respective recesses.

6. The hinge of claim 5, wherein movement of the hinge toward the open position causes the translational first lever-arms acting on the sash movable body in conjunction with movement of the translational second lever-arms that pivot about the third translational pins that connect the sash body pivot connection points of the translational second lever-arms to the sash body, to move the sash movable body to the extended position.

7. The hinge of claim 1, wherein there are two of the FB guide projections located on opposite edges of the FB side of the frame lever-arm and there are two of the FB rotation guide grooves located in opposite walls of the first recess of the frame body, with each of the FB guide projections being located in a respective one of the FB rotation guide grooves.

8. The hinge of claim 7, wherein the FB guide grooves extend generally linearly, parallel to one another in the opposite walls of the first recess of the frame body.

9. The hinge of claim 8, wherein there are two of the SMB guide projections located on opposite edges of the SMB side of the sash lever-arm and there are two of the SMB rotation guide grooves located in opposite walls of the first recess of the sash movable body, with each of the SMB guide projections being located in a respective one of the SMB rotation guide grooves.

10. The hinge of claim 9, wherein the SMB guide grooves extend generally linearly, parallel to one another in the opposite walls of the first recess of the sash movable body.

11. The hinge of claim 1, wherein there are two of the translational guide projections located on opposite edges of the FB side of the translational second lever-arm and there are two of the translational guide grooves on opposite walls of the second recess, with each of the translational guide projections being located in a respective one of the translational guide grooves.

12. The hinge of claim 11, wherein the translational guide grooves extend parallel to one another with a curved path in the opposite walls of the second recess.

13. The hinge of claim 1, wherein the frame body is adjustably mounted in the frame mounting part.

14. The hinge of claim 1, wherein the frame lever-arm includes a slot between the FB side and the SMB side, the sash lever-arm extends through the slot, connection of the frame lever-arm at the frame lever-arm medial position to the sash lever-arm at the sash lever-arm medial position is in an area of the slot.

15. The hinge of claim 1, wherein the hinge is configured for use in flush and rebated mounting applications.

* * * * *